(12) United States Patent
Lee et al.

(10) Patent No.: US 8,739,018 B2
(45) Date of Patent: May 27, 2014

(54) SYSTEM AND METHOD FOR LOADING AND PLAYING

(75) Inventors: Bede Lee, Taipei (TW); Sam Shen, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1940 days.

(21) Appl. No.: 11/341,685

(22) Filed: Jan. 30, 2006

(65) Prior Publication Data

US 2006/0179402 A1 Aug. 10, 2006

(30) Foreign Application Priority Data

Feb. 4, 2005 (TW) .............................. 94103537 A

(51) Int. Cl.
 *G06F 17/00* (2006.01)
 *G06F 17/30* (2006.01)
(52) U.S. Cl.
 CPC .... *G06F 17/30017* (2013.01); *G06F 17/30053* (2013.01)
 USPC ........... 715/203; 715/201; 715/202; 715/704; 715/716; 715/723; 715/733
(58) Field of Classification Search
 CPC ..................... G06F 17/30053; G06F 17/30017
 USPC .............. 715/500.1, 723, 201–203, 704, 716, 715/733
 See application file for complete search history.

(56) References Cited

U.S. PATENT DOCUMENTS

| | | | | |
|---|---|---|---|---|
| 5,598,352 | A * | 1/1997 | Rosenau et al. .............. | 715/203 |
| 6,084,581 | A * | 7/2000 | Hunt ............................. | 715/202 |
| 6,122,668 | A * | 9/2000 | Teng et al. .................... | 709/231 |
| 6,269,216 | B1 * | 7/2001 | Abecassis ...................... | 386/262 |
| 6,442,658 | B1 * | 8/2002 | Hunt et al. .................... | 711/158 |
| 6,487,564 | B1 * | 11/2002 | Asai et al. ..................... | 715/201 |
| 6,502,194 | B1 * | 12/2002 | Berman et al. ................... | 726/28 |
| 6,629,318 | B1 * | 9/2003 | Radha et al. .................. | 725/134 |
| 6,753,882 | B2 * | 6/2004 | Nakazawa et al. ............ | 715/708 |
| 6,889,193 | B2 * | 5/2005 | McLean ........................ | 704/500 |
| 6,898,799 | B1 * | 5/2005 | Jarman ........................... | 725/25 |
| 7,017,120 | B2 * | 3/2006 | Shnier ........................... | 715/783 |
| 7,480,694 | B2 * | 1/2009 | Blennerhassett et al. ...... | 709/203 |
| 7,797,064 | B2 * | 9/2010 | Loomis et al. .................. | 700/94 |
| 2002/0124132 | A1 * | 9/2002 | Haines et al. ................. | 711/112 |
| 2002/0177914 | A1 * | 11/2002 | Chase ............................ | 700/94 |
| 2003/0137531 | A1 * | 7/2003 | Katinsky et al. .............. | 345/716 |
| 2004/0024900 | A1 * | 2/2004 | Breiter et al. ................. | 709/231 |
| 2004/0138948 | A1 * | 7/2004 | Loomis .......................... | 705/14 |
| 2005/0044481 | A1 * | 2/2005 | Collart ....................... | 715/500.1 |
| 2005/0172122 | A1 * | 8/2005 | Risan et al. .................... | 713/165 |
| 2005/0207734 | A1 * | 9/2005 | Howell et al. .................. | 386/68 |
| 2006/0155400 | A1 * | 7/2006 | Loomis .......................... | 700/94 |
| 2007/0088674 | A1 * | 4/2007 | Kawate et al. ..................... | 707/2 |

FOREIGN PATENT DOCUMENTS

CN 1560845 1/2005

* cited by examiner

*Primary Examiner* — Cesar Paula
*Assistant Examiner* — David Faber
(74) *Attorney, Agent, or Firm* — McClure, Qualey & Rodack, LLP

(57) ABSTRACT

A system and method for loading and playing multimedia information are disclosed. A navigator sends a series of play orders that each play order demands for playing a corresponding multimedia segment. A playing engine demands a loader to provide the corresponding multimedia segment according to related play order. A decoder is used to decode the provided multimedia segment for playback. Each play order may be delivered even the multimedia segment corresponding to its previous play order has not been played completely yet. The information discontinuity disadvantage can be eliminated since there is a smooth multimedia information stream provided for the decoder.

6 Claims, 3 Drawing Sheets

SYSTEM AND METHOD FOR LOADING AND PLAYING

CROSS REFERENCE TO RELATED APPLICATIONS

This application claims the benefit of Taiwan. Application No. 94103537, filed on Feb. 4, 2005, which is herein incorporated by reference for all intents and purposes.

BACKGROUND OF THE INVENTION

1. Field of the Invention

The present invention generally relates to multimedia playing, and more particularly to a system and method that loads and plays the multimedia without information discontinuity.

2. Description of the Prior Art

Applications of the multimedia information are getting more and more popular, and there are more and more multimedia playback systems designed for playing multimedia information. Those systems, e.g. CD players, DVD players, MP3 players, etc, have become standard equipments in human daily lives now. A multimedia playback system usually employs a loader, which is usually integrated by means of electrical and mechanical components, to retrieve the multimedia information from a compact disc, a hard disk, a memory of the multimedia information system, or the like. Therefore, the multimedia information can be recorded onto a portable medium so that the loader may load the multimedia information directly whenever a user wants to play the multimedia information recorded thereon.

A multimedia playback system usually employs a navigator to control the playing progress according to a series of play orders, wherein each play order correspondent to a playing progress is further correspondent to a multimedia segment. A series of multimedia segment can be controlled by a series of play orders, which indicates that the multimedia information can be shown by playing associated multimedia segments. Basically, a playing progress may be impermanent and could be changed any time. As some examples, a user may demand playing forward, playing fast forward, playing backward, or playing fast backward any time he/she wants. Besides, the loader can provide only one multimedia segment at a time, thus the multimedia playback system usually employs a buffer used for storing the multimedia information. However, the size of the buffer may introduce another limitation for the size of multimedia segments.

A play engine (PE) controls the playing of multimedia segments by demanding and playing all retrieved multimedia segments according to a play order. Basically, a decoder (DEC) is to decode the multimedia segments after the data-retrieving operation is complete. FIG. 1 illustrates an operating flow for playing a multimedia segment in a multimedia playback system. Firstly, referring to step 110, the navigator 10 sends a play order when the play engine 20 is in a play engine standby mode. Next, the play engine 20 demands the loader 30 to provide a multimedia segment after receiving the play order in step 120, and then the play engine 20 receives a response from the loader 30 to indicate that the loader 30 returns to a loader standby mode after the multimedia segment has been provided in step 130. Afterwards, the decoder 40 decodes the multimedia segment fed from the loader 30 for the sake of playback in step 140, and then the play engine 20 receives a response from the decoder 40 to indicate that the decoder 40 returns to a decoder standby mode. Finally, referring to step 160, the play engine 20 issues a response indicative of the play engine 20 returns to a play engine standby mode to the navigator 10.

Accordingly, any consequent command in a play order sequence cannot be sent for playback until a previous one correspondent to the command has been manipulated. Thus, a decoder will idle in the decoder standby mode before the next multimedia segment is loaded. A problem that playing multimedia segments discontinuously resulting from decoder idles might displease customers who are enjoying entertainments from the playing multimedia information.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

The objective of the present invention is to resolve the playback discontinuity problem when playing of multimedia segments.

Accordingly, the present invention discloses a system and a method for multimedia reading and playing. A navigator is used to send a series of play orders, wherein each play order requests for playing a corresponding multimedia segment. A playing engine is used to request a loader to provide a multimedia segment correspondent to the play order. Each play order is sent after the multimedia segment corresponding to a previous play order is provided but not played completely yet. A timing of issuing a next play order is determined according to a time the navigator receives a response from the loader, characteristics of the next play order, and the data transmission rate for delivering the multimedia information.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
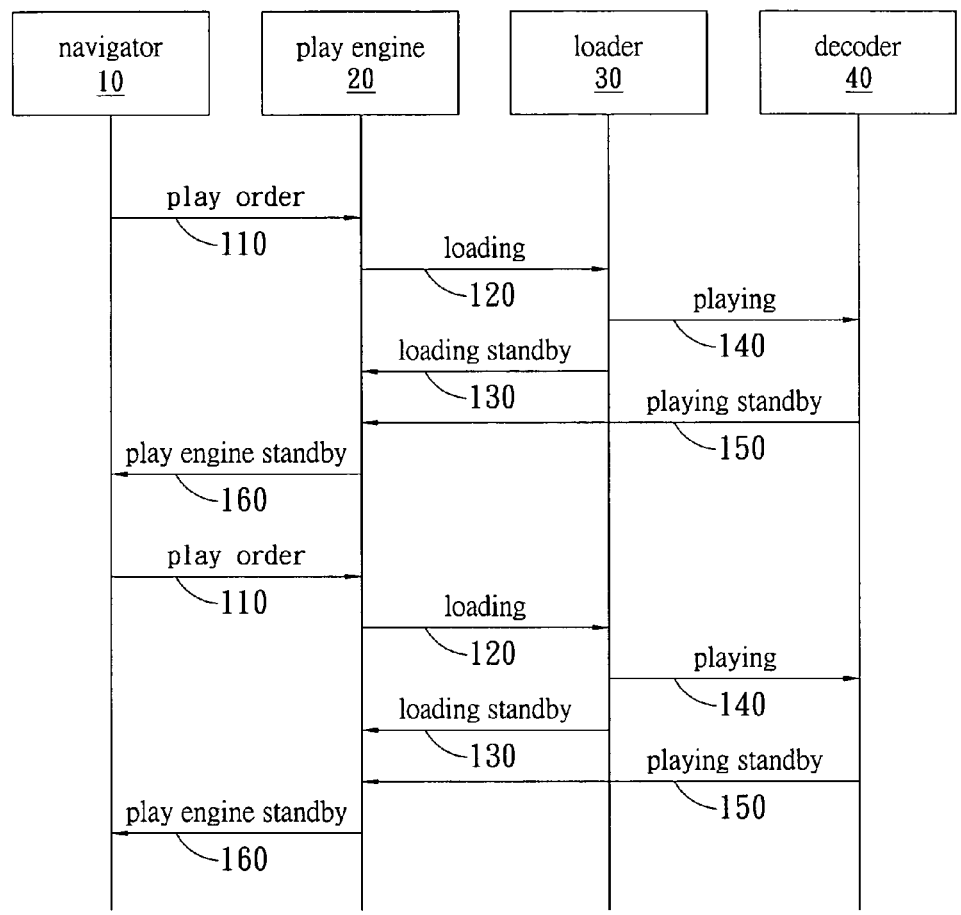
FIG. 1 is a diagram illustrates an operating flow of the prior art.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 2:
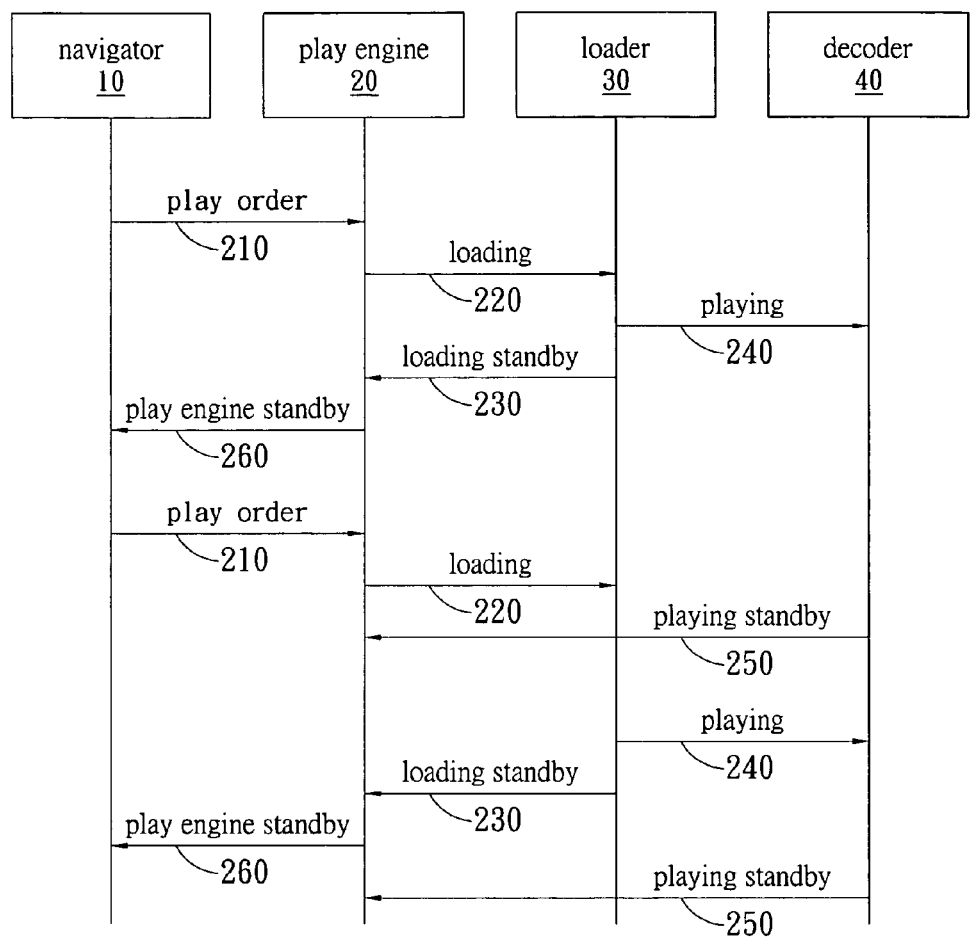
FIG. 2 is an operating flow depicting one embodiment of the present invention.

One embodiment of the present invention discloses a loading and playing method for playing multimedia accompanied with a plurality of multimedia segments. Each multimedia segment is played by means of a play order sequence, respectively. FIG. 2 illustrates a flow diagram of playing a multimedia segment correspondent to a play order. Firstly, referring to step 210, the navigator 10 sends a play order when the play engine 20 is in the play engine standby mode. Next, the play engine 20 demands the loader 30 to provide a multimedia segment according to the play order issued from the navigator 10 in step 220, and then the play engine 20 receives a loader response indicative of the loader 30 is in the loader standby mode when the multimedia information is retrieved and delivered in step 230. Afterwards, referring to step 240, the decoder 40 decodes the multimedia segment provided by the loader 30 in step 240, and then the play engine 20 receives a decoder response indicative of the decoder 40 returns to the decoder standby mode in step 250. Furthermore, referring to step 260, the navigator receives a response that indicates the play engine 20 returns to the play engine standby mode after the play engine 20 receives the response issued from the loader 30 indicative of the loader is in the loader standby mode. Please note that a successive play order of the currently manipulated and played one is issued from the navigator 10 to the play engine 20 after the loader response being received by the navigator. Additionally, the successive play order is issued when the currently played multimedia information has not been played completely yet. A timing of issuing a next play order is determined according to a time the navigator receives the loader response, and characteristics of the successive play order, and the data transmission rate for delivering the multimedia information. So-called characteristics of the successive play order in the invention may include data format and size of the multimedia information. On the other hand, the transmission rate may depend on the capability of said loading and playing system transmits and manipulates said second play order transmitting and manipulating the multimedia information, which includes the manipulation capability of the navigator, the performance of multimedia information transmission, and the memory size of the multimedia playback system. The navigator may calculate required timing adapted to issue the successive play order according to applications based on the aforementioned parameters.

Figure 3:
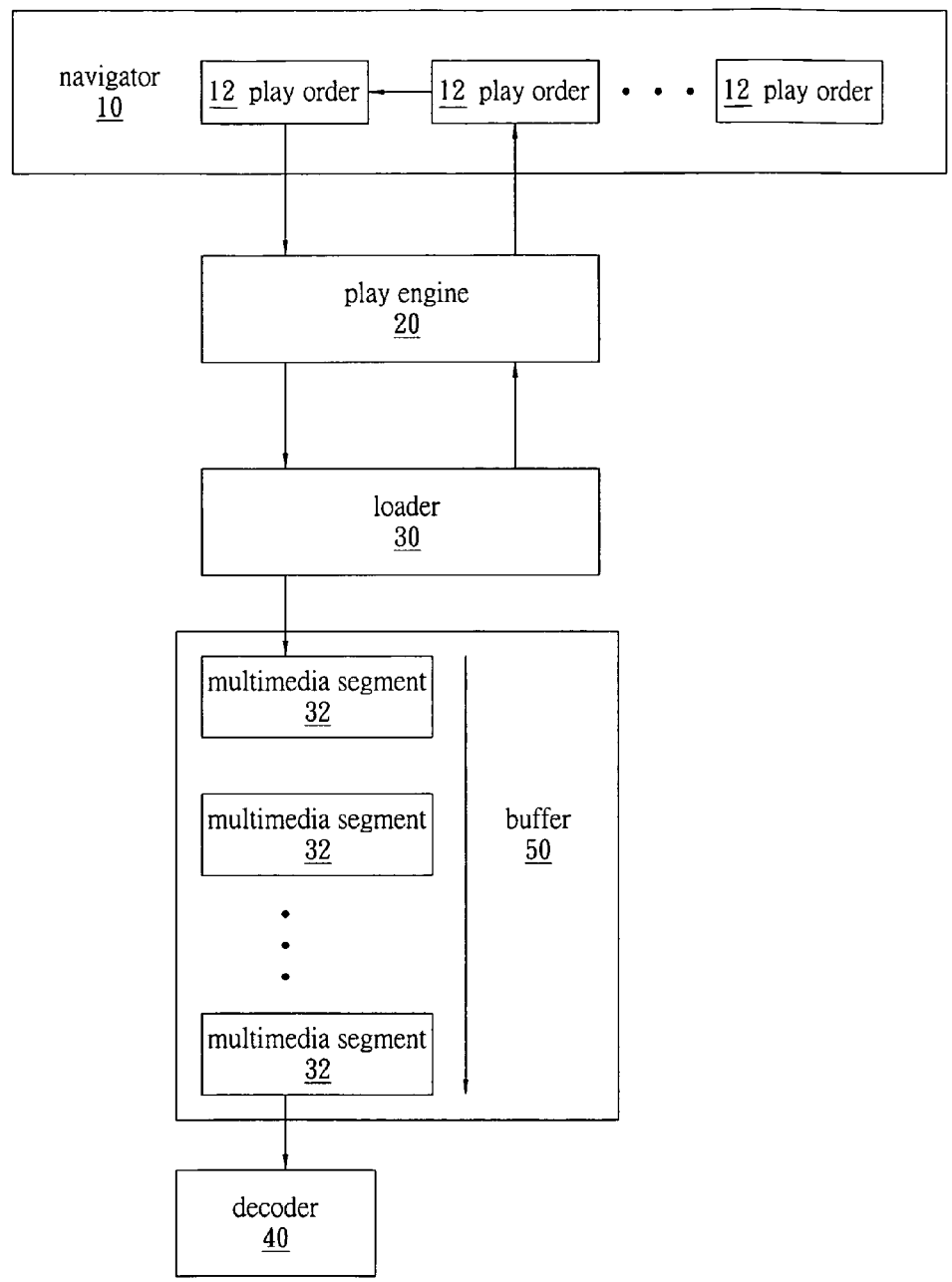
FIG. 3 is a flow diagram showing another embodiment of the present invention.

Another embodiment of the present invention depicting a loading and playing system is shown in FIG. 3, which includes a navigator 10, a play engine 20, a loader 30, and a decoder 40. The decoder 40 decodes a multimedia segment 32 provided by the loader 30 for playback. The play engine 20 demands the loader 30 to provide the multimedia segment sequence according to a play order sequence composed of a plurality of play orders, wherein each play order 12 is correspondent to at least one multimedia segment 32 in the multimedia segment sequence separately. The play orders in the play order sequence is delivered successively by the navigator 10 based on associated timing, wherein each play order can be sent without being forced to wait for the multimedia segment prior to the play order has been played completely in the embodiment. For example, the play order sequence includes at least a first play order and a second play order. When the play engine 20 demands the loader 30 to provide a second multimedia segment correspondent to a second play order, the second play order can be stored in a buffer 50 waiting for the loader 30 even though the multimedia information relative to the first play order has not been played completely yet. Please note that the first play order and the second play order can be arbitrary two successive play orders in the play order sequence, which indicates that the information discontinuity disadvantage can be eliminated since the loader 30 may consecutively provide the multimedia segment 32 to the decoder 40 via the buffer 50.

In implementation, the aforementioned play orders are orderly placed in a play order sequence and are generated by the operations of the external software or hardware. No matter whether the decoder 40 has finished the function of playing the multimedia segment correspondent to a previous play order or not, each play order may be issued by the navigator 10 after the loader 30 is in the loader standby mode. That is, the successive multimedia segment can be loaded when the current multimedia segment is still playing. Therefore, as long as related timing of issuing the play orders can be arranged appropriately, the loader 30 can provide multimedia segments smoothly. Thus, the disadvantage that the multimedia playback system might pause to wait for the successive multimedia segment can be eliminated.

For examples, the navigator sends a first play order when the loader 30 is in the loader standby mode, then the play engine 20 demands the loader 30 to provide a first multimedia segment according to the first play order. Thereafter, the decoder 40 starts to decode the first multimedia segment provided by the loader 30. After the first multimedia segment is sent for playback, the decoder 40 returns to the decoder standby mode. No matter whether the decoder 40 is in decoder standby mode or not, the play engine 20 demands the loader 30 to provide a second multimedia segment according to the second play order provided by the navigator 10, wherein the loader 30 is in the loader standby mode now. After the decoder 40 decodes the first multimedia segment and returns to the decoder standby mode, the second multimedia segment may be retrieved and stored in the buffer ready for the successive decoding procedure. Moreover, after the first multimedia segment is played, the second multimedia segment and a third multimedia segment next to the second multimedia segment will be regarded as the first multimedia segment and the second multimedia segment, respectively.

The multimedia segments (i.e. the first multimedia segment and the second multimedia segment) of the embodiments might be provided via a buffer. For example, the decoder 40 retrieves the multimedia segments from the buffer 50 for decoding before playback. Namely, the multimedia information can be played uninterruptedly as long as at least a portion of a multimedia segment remains in the buffer all the time. Therefore the manner for loading the multimedia segments must meet the requirement of the loader 40, i.e. the buffer must contain enough space to load at least two multimedia segments (i.e. the first multimedia segment and the second multimedia segment). That is, the buffer size may be excess or equal to the size summation of the first multimedia segment and the second multimedia segment. Accordingly, the successive multimedia segment can be loaded and stored into the buffer when the current multimedia segment is playing. Moreover, new multimedia segments can be stored into a free space of the buffer, wherein those spaces used to hold the multimedia segments which have been completely played can be considered as portions of the free space aforementioned. In other words, those spaces holding the multimedia segments that have been played will be reallocated for holding the new multimedia segments.

In addition, the loader 40 is integrated by using at least a storage medium for retrieving the multimedia segment sequence, wherein the storage medium can be a compact disc drive, a hard disk, a memory, or any other type of device for storing electrical records (digital or analog).

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A loading and playing system, in a hardware processor, for multimedia information playback, comprising:
   a decoder for decoding a multimedia segment sequence with a plurality of multimedia segments for playback, wherein said multimedia segment sequence includes at least a first multimedia segment and a second multimedia segment;
   a loader for providing a multimedia segment sequence to said decoder according to a play order sequence;
   a play engine for demanding the loader to provide said multimedia segment sequence to said decoder according to the play order sequence, wherein said multimedia segment sequence is provided in response to a signal sent from said decoder; and
   a navigator for sending said play order sequence to said play engine, wherein said play order sequence includes at least a first play order and a second play order, wherein said second play order is issued when said first multimedia segment has not been completely played yet and in response to a response from said play engine indicative of said first multimedia segment being provided to said decoder;
   wherein said play engine demands said loader to provide said first multimedia segment to said decoder according to said first play order, and said loader sends a loading standby response to said play engine after said first multimedia segment is provided;
   wherein said play engine sends a play engine standby response to said navigator after receiving said loading standby response, and said navigator sends said second play order to said play engine;
   wherein said decoder sends a playing standby response to said play engine after said first multimedia segment is completely played by said decoder; and
   wherein said play engine receives said second play order before said playing standby response.

2. The loading and playing system of claim 1, wherein said loader provides said multimedia segment sequence via a buffer, and a size of said buffer is excess or equal to the size summation of said first multimedia segment and said second multimedia segment, wherein said multimedia segments are loaded into a free space of said buffer, and a space holding said multimedia segments which have been played is assigned as a portion of said free space.

3. The loading and playing system of claim 1, wherein a timing of issuing said second play order is determined according to a time a loader response is received by said navigator and characteristics of said second play order.

4. The loading and playing system of claim 3, wherein said characteristics of said second play order includes data format, a size of said multimedia information according to said second play order, and transmission rate that said loading and playing system transmits and manipulates said second play order.

5. The loading and playing system according to claim 1, wherein:
   in response to the response from said play engine indicative of said first multimedia segment being provided to said decoder, said second play order is issued and stored in a buffer to await processing by the loader, whereby after being stored in the buffer, content from the second play order may be operated upon by the loader without discontinuity.

6. The loading and playing system according to claim 1, wherein the second play order is the opposite of the first play order.

* * * * *